Feb. 17, 1931.  T. J. C. SCHIRRMACHER  1,792,933
LIQUID MEASURING DEVICE
Filed July 18, 1927   2 Sheets-Sheet 1
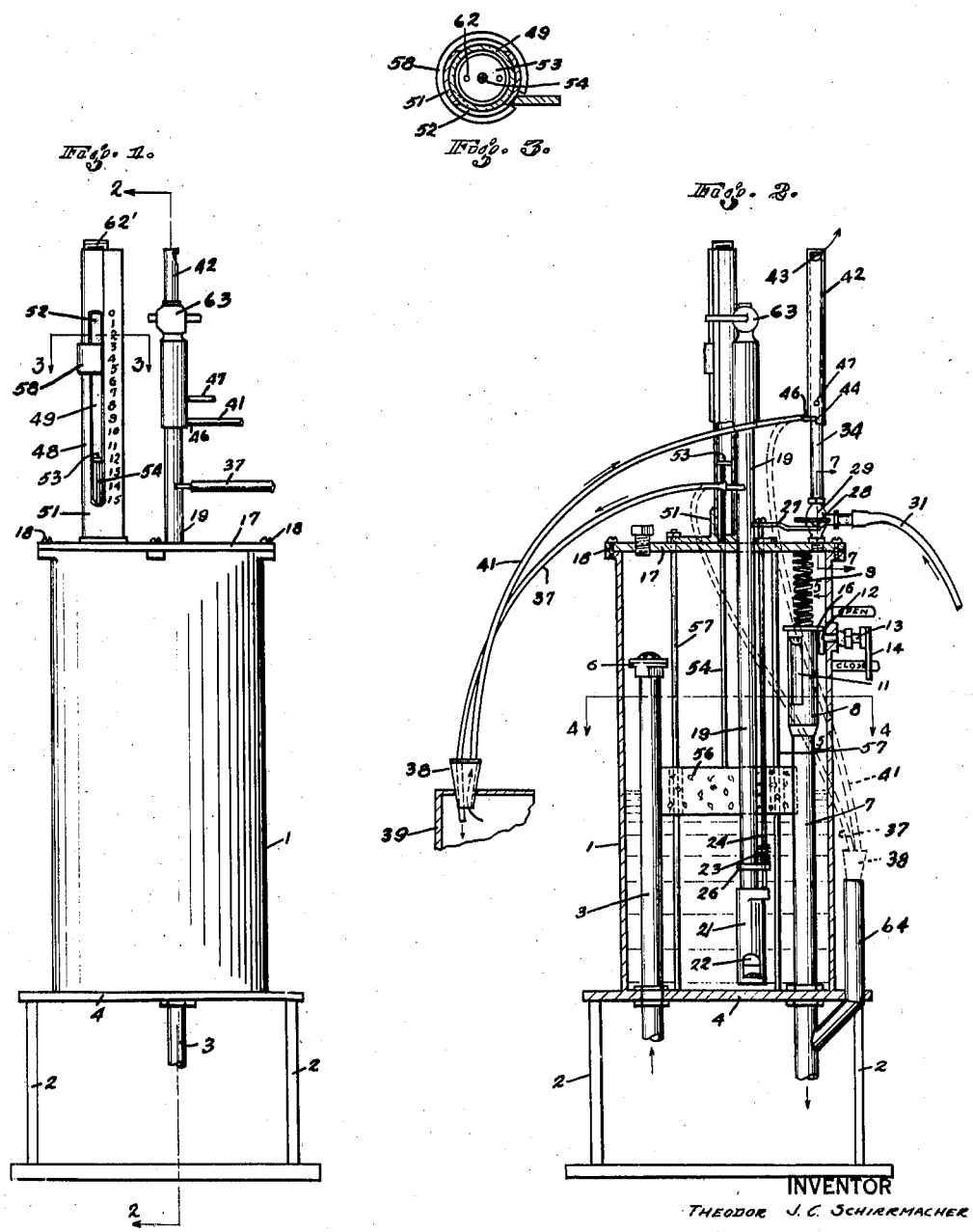
INVENTOR
THEODOR J.C. SCHIRRMACHER
BY
ATTORNEYS.

Feb. 17, 1931. T. J. C. SCHIRRMACHER 1,792,933
LIQUID MEASURING DEVICE
Filed July 18, 1927 2 Sheets-Sheet 2
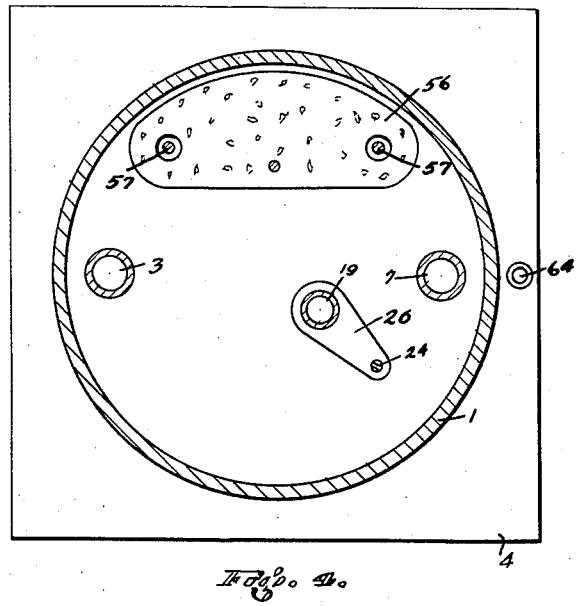
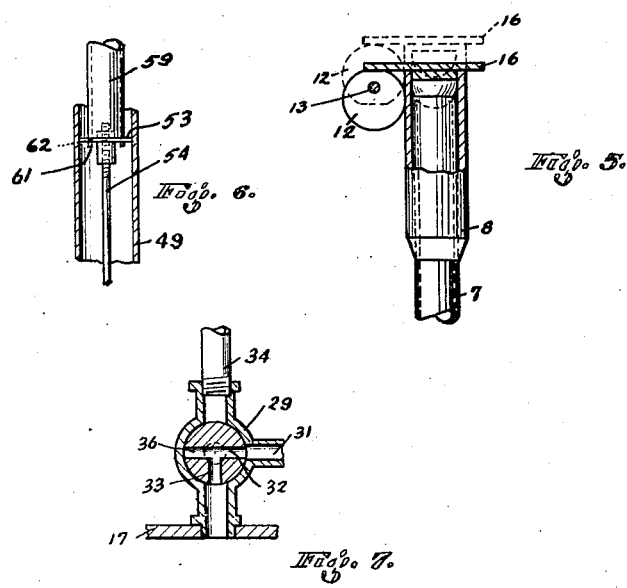
INVENTOR
THEODOR J.C. SCHIRRMACHER
BY
ATTORNEYS.

Patented Feb. 17, 1931

1,792,933

UNITED STATES PATENT OFFICE

THEODOR J. C. SCHIRRMACHER, OF OAKLAND, CALIFORNIA

LIQUID-MEASURING DEVICE

Application filed July 18 1927. Serial No. 206,738.

The present invention relates to improvements in liquid measuring devices and has particular reference to gasoline dispensers adapted to be used in service stations, garages and the like. The principal object of the invention is to provide a measuring device of this character that insures correct measurement and at the same time safety in operation. It is particularly proposed to use for this purpose a container that may be made of metal or other suitable non-breakable material from which gasoline may be dispensed by air pressure bearing on the surface of the gasoline in said container while a gauge surmounts the container and a float riding on the liquid has an indicator associated therewith which allows the lowering of the float to be observed on the gauge so that the purchaser of the gasoline can watch the amount measured out. The only transparent and breakable part of this device is the gauge and since the transparent portion of the gauge may be very small, danger of breakage and subsequent explosion is practically eliminated. At the same time correctness of measurement is insured since the falling of the level of the gasoline may be closely watched and the amount dispensed definitely established by figuring the cubic content of the container between two levels.

Other objects and advantages of my invention will appear as the specification proceeds.

The preferred form of my invention is illustrated in the accompanying drawing in which Figure 1 shows a side elevation of my measuring device;

Figure 2, a vertical section taken along line 2—2 of Figure 1;

Figure 3, a horizontal section taken along line 3—3 of Figure 1;

Figure 4, a horizontal section taken along line 4—4 of Figure 2;

Figure 5, a detail view of the upper end of an overflow pipe as viewed from line 5—5 of Figure 2;

Figure 6, a detail view showing means for adjusting an indicator relative to a float used in my device; and Figure 7, a detail view in section of a three-way valve used in the air pressure line of my device.

While I have shown only the preferred form of my invention, I wish to have it understood that various changes or modifications may be made within the scope of the claims hereto attached without departing from the spirit of the invention.

In its preferred form my device comprises a cylindrical container 1 which may be supported vertically at a suitable distance from the ground surface by means of posts 2. An intake pipe 3 extends through the bottom 4 of the container to a substantial height and is provided with a check-valve at 6 to prevent air under pressure to escape through the same. An overflow pipe 7 also extends through the bottom 4 into the container to a desired height, preferably near the top of the container, and is provided with a cap 8 which is slidable on the pipe and normally depressed by means of a spring 9 arranged between the cap and the top of the container whereby the overflow pipe is normally kept closed. The cap 8 is formed with a perforation 11 in the side thereof which opens the overflow pipe to the liquid within the container when the cap is raised, which operation may be performed by means of a cam 12 at the end of a stem 13 extending outside of the container and operated by means of a handle 14, the cam 12 engaging a flange 16 of the cap. It will be understood that when the handle 14 is swung from the position indicated in Figure 2 into the open position, the cam 12 raises the flange 16 and thereby opens the overflow pipe. The container may thus be filled to a definite height so as to contain a definite amount of gasoline.

The container is closed on top by means of a lid 17 held in place by suitable bolts 18 and a discharge pipe 19 is held in the lid and extends downwardly to a place near the bottom of the container. The lower end of the discharge pipe is provided with a cap 21 which is slidable on the pipe and closes the same when pushed upward but opens the pipe, when lowered, by means of perforations 22 provided in the side of the cap. The cap is normally held in pipe-closing position by means of a spring 23 fixed to a rod 24 extending upwardly from the cap 21 and bearing on a fixed member 26. The rod 24 extends through the lid and is provided above the lid with an operating member 27 extending into operative proximity of the handle 28 of a valve 29 to be referred to hereinafter, so that when the handle 28 is turned it depresses the operating member 27 and the rod 24 for opening the discharge pipe 19.

The liquid within the container is forced through the discharge pipe 19 by means of compressed air entering from any suitable source through the hose 31 and the valve 29 previously mentioned. The latter valve is illustrated in detail in Figure 7 and is of the three-way type providing, when in the position indicated in Figure 2, communication between the hose 31 and the inside of the container through ports 32 and 33, and when swung through a quarter of a turn providing communication between the container and a vent pipe 34 through the ports 32 and 36. It will be noted that when the valve is turned for allowing compressed air to enter the tank the handle of the valve maintains the discharge pipe 19 open, and that when the valve is turned through a quarter of a turn so that the inside of the container communicates with the vent pipe 34, the discharge pipe 19 is allowed to close under the influence of the spring 23. If the valve is turned through one-eighth of a revolution only, so as to occupy a midway position, it closes the container against communication with either the hose 31 or the vent 34 while it allows the pipe 19 to close so that the air pressure existing within the container remains there while no gasoline is discharged.

The discharge pipe 19 communicates with a hose 37 provided at the end thereof with a funnel-shaped nozzle 38 adapted to enter the opening of the gasoline tank 39 to be filled, and formed so as to seal the opening. The hose 37 takes up only part of the space of the funnel 38 so that gas vapors driven out of the tank 39 by the liquid gasoline may escape through the funnel 38 and pass through a second hose 41 into the vent pipe 34. The latter may be closed against the atmosphere by a sliding cap 42 formed with an opening 43 in the side thereof which allows the vent pipe 34 to communicate with the atmosphere when the cap 42 is slightly raised. This raising movement is effected by means of a cam face 44 at the bottom of the cap 42 riding on the connecting end of the hose 46 when the cap is turned by means of a pin 47 projecting therefrom.

A gauge 48 is mounted on top of the container and comprises a glass tube 49 enclosed by a housing 51 formed with a slot 52 disclosing a section of the glass tube. In the glass tube travels an indicating disc 53 disposed at the upper end of a rod 54 extending upwardly from a float 56 riding on the liquid in the container and guided by means of posts 57. It will be noted that as the float rises and falls due to changes in the level of the liquid the disc 53 also rises and falls in the glass tube 49 and indicates the changes made on a scale provided alongside of the slot 52, the scale indicating the number of gallons dispensed, beginning with zero and counting downwardly. A sleeve 58 is slidable on the gauge housing and may be moved opposite any of the figures of the scale to indicate a starting point other than zero.

It is important, of course, that when the liquid level is up to the height of the overflow pipe the indicator 53 should be exactly at zero.

Now it may happen that the buoyancy of the float changes slightly with its use and I therefore arranged the indicator 53 with freedom of adjustment to compensate for changes in the buoyancy of the float. This is illustrated in detail in Figure 6, in which the disc 53 is shown as being threaded on the rod 54 and adapted to be adjusted thereon by means of a tube 59 adapted for introduction through the top of the gauge and provided with prongs 61 adapted for insertion in registering perforations 62 of the disc. Normally, the top of the gauge is closed by means of a plug 62'.

The discharge pipe 19 may be closed at its top by means of a valve 63 which latter valve may be opened after the completion of the dispensing operation to release the vacuum and to allow gasoline to freely flow from the conduit 37 into the tank 39.

The manner of using the device is apparent from the foregoing description. Gasoline is admitted from any suitable source through the intake pipe 3 until it begins to overflow the edge of the pipe 7. The inflow of gasoline is then stopped and the cap 8 depressed on the overflow pipe by operation of the handle 14, so that now the container has a definite amount of gasoline therein. The container being full to its limit, the float rises to its highest point so that the indicator shows zero on the scale. If gasoline is to be dispensed the operator turns the valve handle 28 which subjects the surface of the gasoline to air pressure and at the same time opens the discharge pipe 19 so that gasoline is discharged through the hose 37 into the automobile tank 39. The float sinks with the level of the gasoline in the tank and indicates on the scale the amount of gasoline dispensed. When the indicator reaches the desired point, say 5, on the scale the operator turns the valve handle 28 through one-eighth of a turn which shuts off the inside of the container against both the pressure conduit 31 and the vent 34, while allowing the discharge pipe 19 to close so that the pressure remains in the tank without any further discharge taking place. The operator then moves the sleeve 58 downward on the scale to indicate the amount dispensed during the previous operation, namely five gallons, so that the next operation may start with five as the zero. While the gasoline flows into the automobile tank 39, gas vapors driven out of the tank are guided through the funnel 38 and the conduit 31 into the vent pipe 34 from where they are either discharged into the atmosphere when the vent pipe is open, or returned to the tank if the valve 29 is in the proper position. After removing the nozzle 38 from the automobile tank the same may be inserted in a branch pipe 64 leading into the overflow pipe 7 as indicated in dotted lines. When it is desired to refill the tank the valve 29 is turned through a quarter of a revolution so as to cause intercommunication between the container and the vent pipe 34 for allowing air to escape through the container. If the buoyancy of the float should change, adjustment may be made of the disc 53 to compensate for the change.

I claim:

1. In a liquid measuring device, a container, means for feeding liquid thereinto, a discharge conduit extending into the liquid and having a valve at the bottom thereof and an operating member for the same above the container, a vent pipe rising from the container having a pressure conduit leading thereinto and a three-way valve at the juncture whereby the container may be connected either to the vent or the pressure conduit the latter valve having a handle positioned to serve as manipulating means for the operating member.

2. In a liquid measuring device, a container, means for feeding liquid thereinto, a discharge conduit extending into the liquid and having a valve at the bottom thereof and an operating member for the same above the container, a vent pipe rising from the container having a pressure conduit leading thereinto and a three-way valve at the juncture whereby the container may be connected either to the vent or the pressure conduit the latter valve having a handle positioned to serve as manipulating means for the operating member, but adapted to operate the valve for closing the container against the vent pipe and pressure conduit without manipulating the operating member.

THEODOR J. C. SCHIRRMACHER.